United States Patent
Kobayashi

(10) Patent No.: US 12,179,778 B2
(45) Date of Patent: Dec. 31, 2024

(54) DIRECTION CHANGE DETECTION DEVICE, VEHICLE, DIRECTION CHANGE DETECTION METHOD, AND STORAGE MEDIUM

(71) Applicant: TOYOTA JIDOSHA KABUSHIKI KAISHA, Aichi-ken (JP)

(72) Inventor: Isao Kobayashi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 292 days.

(21) Appl. No.: 17/734,124

(22) Filed: May 2, 2022

(65) Prior Publication Data

US 2022/0371603 A1     Nov. 24, 2022

(30) Foreign Application Priority Data

May 20, 2021   (JP) ................................ 2021-085566

(51) Int. Cl.
*B60W 40/114*     (2012.01)
*G07C 5/00*       (2006.01)

(52) U.S. Cl.
CPC ........... *B60W 40/114* (2013.01); *G07C 5/008* (2013.01); *B60W 2520/06* (2013.01); *B60W 2520/14* (2013.01); *B60W 2530/13* (2021.08); *B60W 2540/18* (2013.01)

(58) Field of Classification Search
CPC ........... B60W 40/114; B60W 2520/06; B60W 2520/14; B60W 2530/13; B60W 2540/18; B60W 2050/146; B60W 2540/20; B60W 40/10; B60W 50/14; B60W 40/00; B60W 50/00; G07C 5/008
See application file for complete search history.

(56) References Cited

U.S. PATENT DOCUMENTS

| 6,024,187 A * | 2/2000 | Takeda ................... G01C 21/28 |
| | | 701/31.2 |
| 6,360,162 B1 * | 3/2002 | Meis ....................... G08G 1/20 |
| | | 73/178 R |
| 2017/0073006 A1 | 3/2017 | Satomura |

FOREIGN PATENT DOCUMENTS

| JP | 2012-048595 A | 3/2012 |
| JP | 2016-147561 A | 8/2016 |
| JP | 201754343 A | 3/2017 |
| JP | 2019-095928 A | 6/2019 |

* cited by examiner

*Primary Examiner* — Aniss Chad
*Assistant Examiner* — Chase L Cooley
(74) *Attorney, Agent, or Firm* — HAUPTMAN HAM, LLP

(57) ABSTRACT

An on-board unit as a direction change detection device is configured to acquire a steered angle and a mileage of a vehicle at a time point at which a right turn event related to a right turn of the vehicle occurs when the right turn event occurs, and detect the right turn on condition that a maximum value of the steered angle is equal to or less than a first threshold value, and the mileage is equal to or greater than a second threshold value.

8 Claims, 4 Drawing Sheets

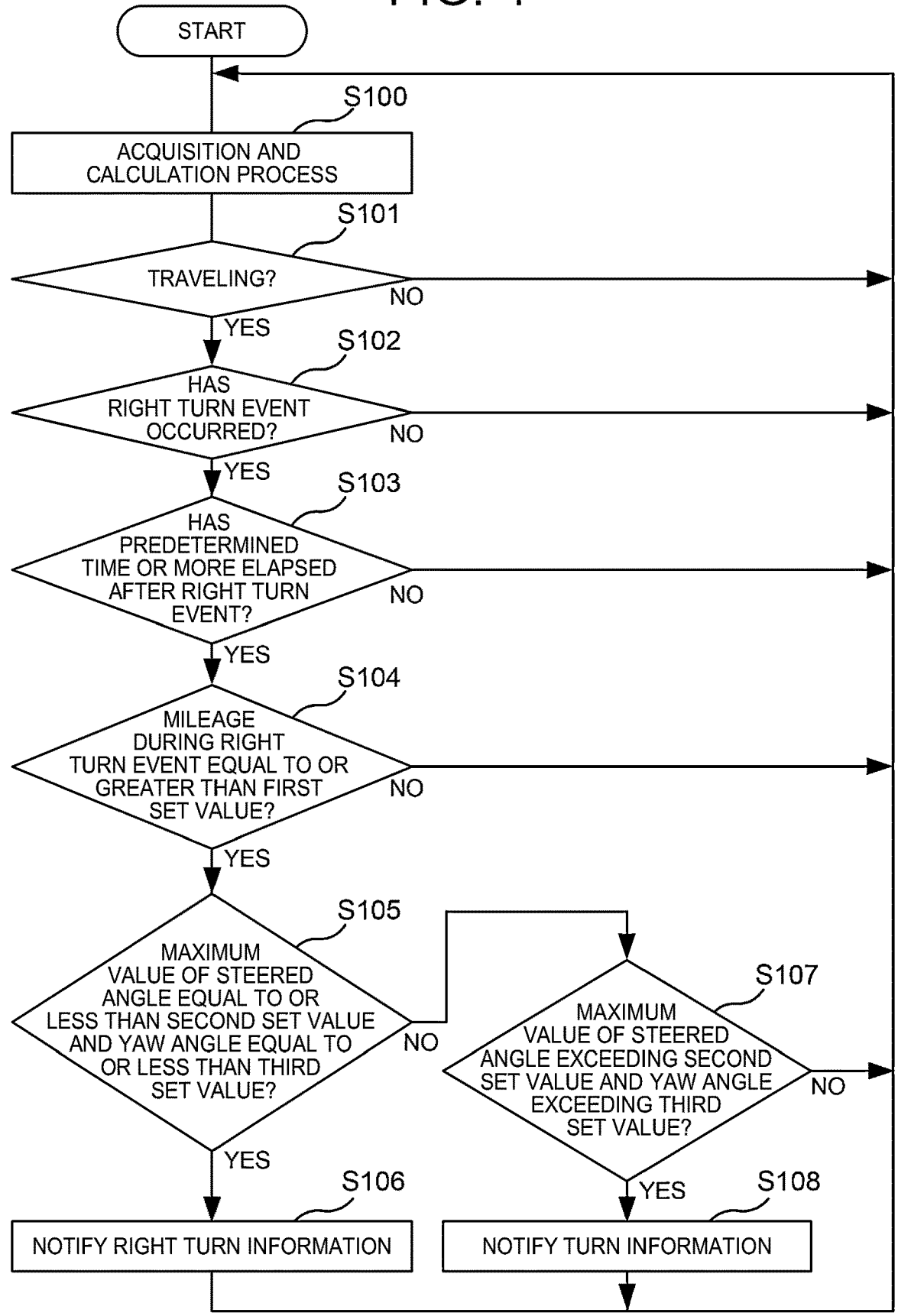

DIRECTION CHANGE DETECTION DEVICE, VEHICLE, DIRECTION CHANGE DETECTION METHOD, AND STORAGE MEDIUM

CROSS-REFERENCE TO RELATED APPLICATION

This application claims priority to Japanese Patent Application No. 2021-085566 filed on May 20, 2021, incorporated herein by reference in its entirety.

BACKGROUND

1. Technical Field

The present disclosure relates to a direction change detection device, a vehicle, a direction change detection method, and a storage medium for detecting a change of a direction of a vehicle in a specific direction.

2. Description of Related Art

Japanese Unexamined Patent Application Publication No. 2017-054343 (JP 2017-054343 A) discloses a behavior detection device mounted on a host vehicle and detecting a behavior of the host vehicle. The behavior detection device detects a wide turn when the host vehicle turns right or left.

SUMMARY

When the right or left turn of the vehicle is detected by the behavior detection device disclosed in JP 2017-054343 A, there is room for improvement in distinguishing a road provided with a plurality of lanes from a residential road and in distinguishing between a right or left turn and a turn.

It is an object of the present disclosure to provide a direction change detection device, a vehicle, a direction change detection method and a storage medium capable of excluding a direction change of a vehicle on a residential road and a turn of the vehicle from determination of a direction change in a specific direction.

A direction change detection device according to claim 1 includes a processor. The processor is configured to acquire a steered angle and a mileage of a vehicle at a time point at which an event related to a direction change of the vehicle in a specific direction occurs when the event occurs, and detect the direction change in the specific direction on condition that a maximum value of the steered angle is equal to or less than a first threshold value, and the mileage is equal to or greater than a second threshold value.

The direction change detection device according to claim 1 can exclude a turn that is a U-turn from a determination of the direction change in the specific direction by setting the case where the maximum value of the steered angle is equal to or less than the first threshold value as a detection condition when the event related to the direction change in the specific direction occurs. Further, the direction change detection device can exclude the direction change on a residential road and the like from the determination of the direction change in the specific direction by setting the case where the mileage of the vehicle is equal to or greater than the second threshold value as the detection condition.

The direction change detection device according to claim 2 is the direction change detection device according to claim 1, and the processor acquires a yaw angle of the vehicle from the time point at which the event occurs, and excludes a case where the yaw angle exceeds a third threshold value from a detection condition of the direction change in the specific direction.

The direction change detection device according to claim 2 can exclude the turn from the determination of the direction change in the specific direction by excluding the case where the yaw angle exceeds the third threshold value from the detection conditions.

The direction change detection device according to claim 3 is the direction change detection device according to claim 1, and the processor excludes a case where a time of the event is less than a predetermined time from a detection condition of the direction change in the specific direction.

The direction change detection device according to claim 3 can exclude the lane change from the determination of the direction change in the specific direction by excluding the short-time direction change from the detection conditions.

The direction change detection device according to claim 4 is the direction change detection device according to claim 1, and the processor provides information related to the direction change to outside of the vehicle when the processor detects the direction change in the specific direction.

With the direction change detection device according to claim 4, information on a vehicle having a high risk of an accident can be provided based on the information related to the direction change in the specific direction.

A vehicle according to claim 5 includes: the direction change detection device according to claim 1; a first detection unit that detects a steering angle of a steering wheel or a steered angle of a steered vehicle wheel of the vehicle; and a second detection unit that detects movement of the vehicle.

With the vehicle according to claim 5, a direction change and a turn of the vehicle on a residential road can be excluded from the determination of the direction change in the specific direction.

In a direction change detection method according to claim 6, a computer executes processes including: acquiring a steered angle and a mileage of a vehicle at a time point at which an event related to a direction change of the vehicle in a specific direction occurs when the event occurs; and detecting the direction change in the specific direction on condition that a maximum value of the steered angle is equal to or less than a first threshold value, and the mileage is equal to or greater than a second threshold value.

In the direction change detection method according to claim 6, the turn that is a U-turn can be excluded from the determination of the direction change in the specific direction as the computer executes a process with the case where the maximum value of the steered angle is equal to or less than a first threshold value set as the detection condition when the event related to the direction change in the specific direction occurs. Further, in the direction change detection method, the direction change on a residential road and the like can be excluded from the determination of the direction change in the specific direction as the computer executes a process with the case where the mileage of the vehicle is equal to or greater than the second threshold value set as the detection condition.

A program stored in a storage medium according to claim 7 causes a computer to execute processes including: acquiring a steered angle and a mileage of a vehicle at a time point at which an event related to a direction change of the vehicle in a specific direction occurs when the event occurs; and detecting the direction change in the specific direction on condition that a maximum value of the steered angle is equal to or less than a first threshold value, and the mileage is equal to or greater than a second threshold value.

In the program stored in the storage medium according to claim 7, the turn that is a U-turn can be excluded from the determination of the direction change in the specific direction as the computer executes a process with the case where the maximum value of the steered angle is equal to or less than the first threshold value set as the detection condition when the event related to the direction change in the specific direction occurs. Further, in the program, the direction change on a residential road and the like can be excluded from the determination of the direction change in the specific direction as the computer executes a process with the case where the mileage of the vehicle is equal to or greater than the second threshold value set as the detection condition.

According to the present disclosure, a direction change and a turn of the vehicle on a residential road can be excluded from the determination of the direction change in the specific direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing a flow of a detection process executed in the on-board unit according to the embodiment.

DETAILED DESCRIPTION OF EMBODIMENTS

A vehicle management system including a direction change detection device according to the present disclosure will be described. The vehicle management system is a system that manages transport vehicles such as a taxi and a truck. The vehicle management system acquires right turn information related to a right turn of a transport vehicle and turn information related to a turn called a U-turn, and analyzes a driving status of the transport vehicle having a high risk of an accident. In the present specification, it is assumed that the driving status is analyzed when the vehicle travels on a road of the left-hand traffic. In other words, "right turn" means a change of direction across the oncoming lane. A right turn in the present embodiment corresponds to a turn in a specific direction.

Overall Structure

Figure 1:
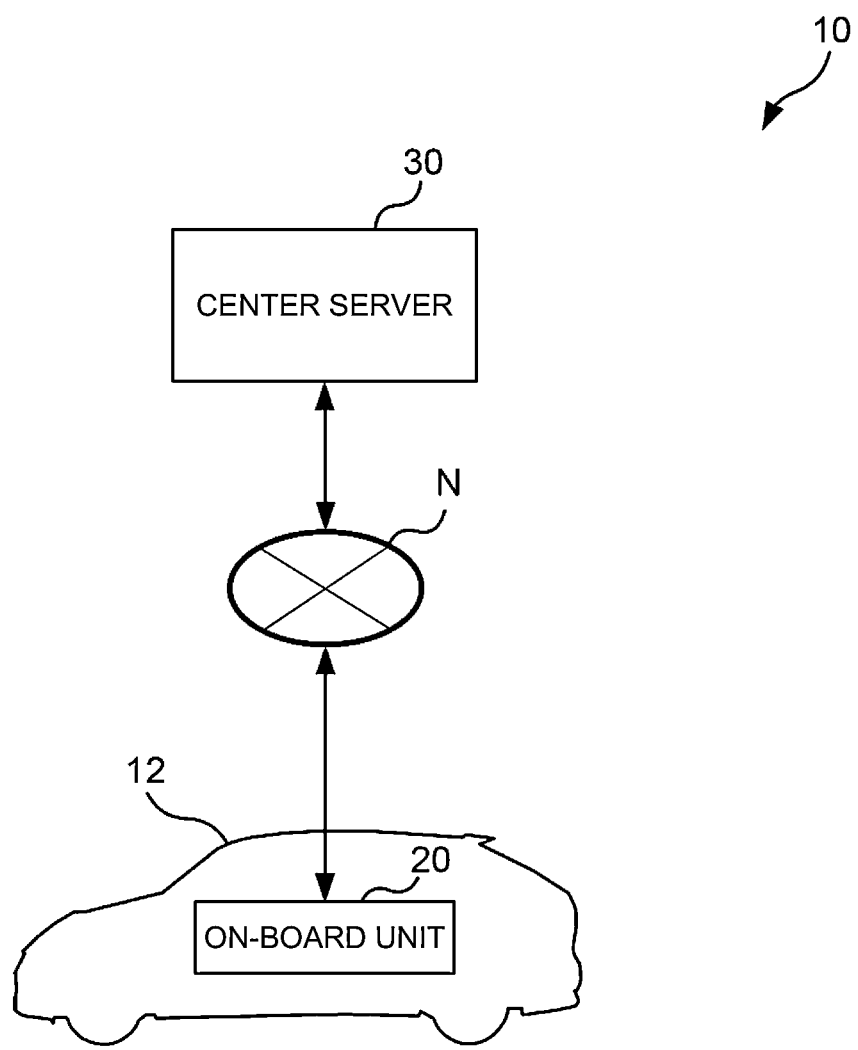
FIG. 1 is a diagram showing a schematic configuration of a vehicle management system according to an embodiment.

As shown in FIG. 1, a vehicle management system 10 according to the present embodiment is configured to include a vehicle 12 and a center server 30. Further, the vehicle 12 is equipped with an on-board unit 20 as a direction change detection device. The on-board unit 20 and the center server 30 are connected to each other through a network N.

The center server 30 acquires the right turn information and the turn information from the on-board unit 20 of the vehicle 12 and analyzes the driving status of the vehicle 12. The center server 30 is installed in, for example, a transportation company that manages the vehicle 12 that is a transport vehicle.

Vehicle

Figure 2:
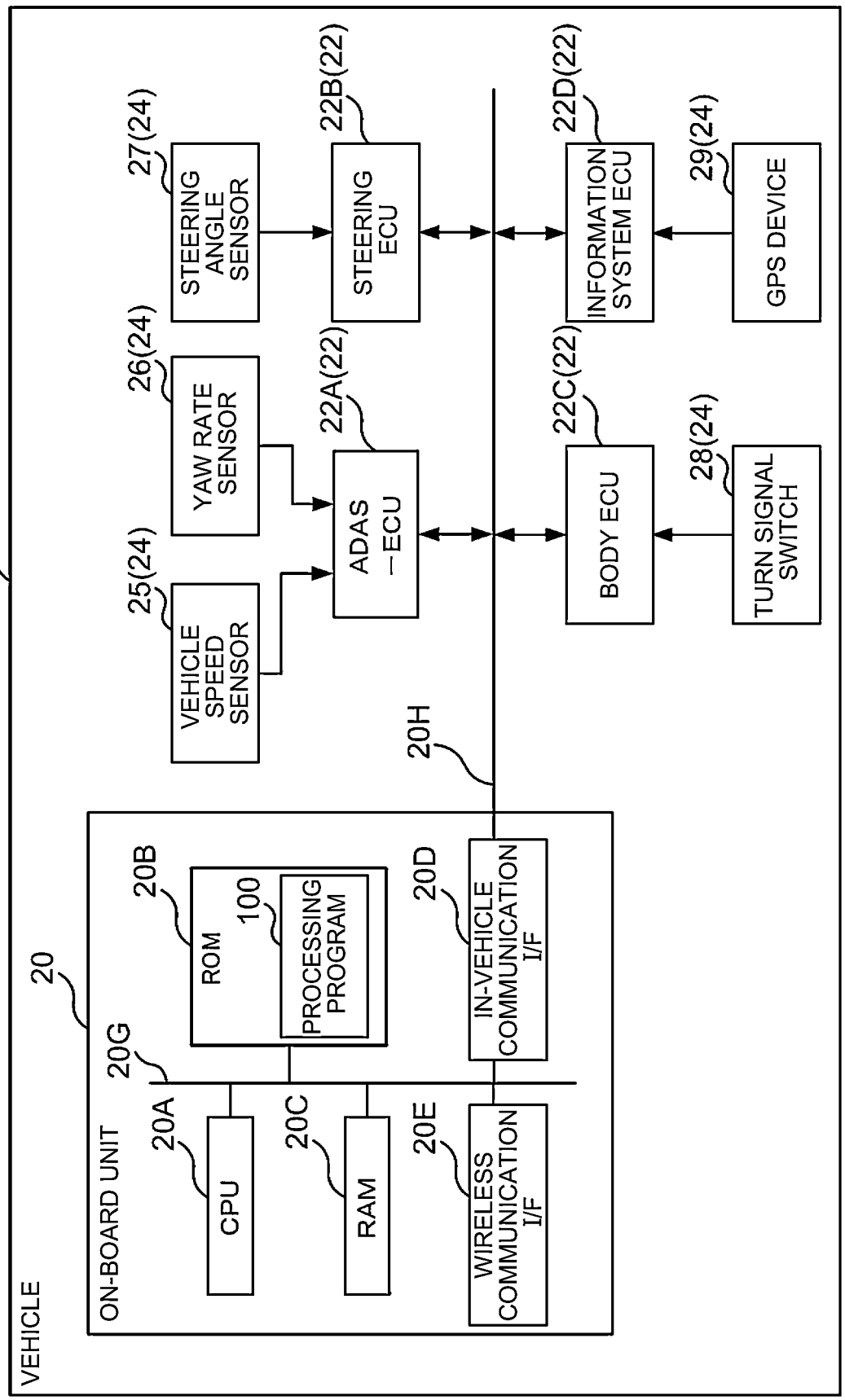
FIG. 2 is a block diagram showing a hardware configuration of the vehicle according to the embodiment.

As shown in FIG. 2, the vehicle 12 according to the present embodiment includes the on-board unit 20, a plurality of electronic control units (ECUs) 22, and a plurality of on-board devices 24.

The on-board unit 20 includes a central processing unit (CPU) 20A, a read-only memory (ROM) 20B, a random access memory (RAM) 20C, an in-vehicle communication interface (I/F) 20D, and a wireless communication I/F 20E. The CPU 20A, the ROM 20B, the RAM 20C, the in-vehicle communication I/F 20D, and the wireless communication I/F 20E are connected so as to be communicable with each other via an internal bus 20G.

The CPU 20A is a central processing unit that executes various programs and controls various units. That is, the CPU 20A reads the program from the ROM 20B and executes the program using the RAM 20C as a work area.

The ROM 20B stores various programs and various data. The ROM 20B of the present embodiment stores a processing program 100 for executing a detection process that will be described later.

The RAM 20C temporarily stores a program or data as a work area.

The in-vehicle communication I/F 20D is an interface for connecting to the ECUs 22. For the interface, a communication standard based on a controller area network (CAN) protocol is used. The in-vehicle communication I/F 20D is connected to an external bus 20H.

The wireless communication I/F 20E is a wireless communication module for communicating with the center server 30. For the wireless communication module, for example, communication standards such as the fifth generation (5G), long term evolution (LTE), and Wi-Fi (registered trademark) are used. The wireless communication I/F 20E is connected to the network N.

The ECUs 22 include an advanced driver assistance system (ADAS)-ECU 22A, a steering ECU 22B, a body ECU 22C, and an information system ECU 22D.

The ADAS-ECU 22A controls an advanced driver assistance system in an integrated manner A vehicle speed sensor 25 and a yaw rate sensor 26 that are the on-board devices 24 are connected to the ADAS-ECU 22A. The vehicle speed sensor 25 is an example of a second detection unit.

The steering ECU 22B controls power steering. A steering angle sensor 27 that is the on-board device 24 is connected to the steering ECU 22B. The steering angle sensor 27 is a sensor that detects the steering angle of a steering wheel. The steering angle sensor 27 is an example of a first detection unit.

The body ECU 22C controls lights such as turn signals. A turn signal switch 28 that is the on-board device 24 is connected to the body ECU 22C.

The information system ECU 22D controls a car navigation system, audio, and the like. A global positioning system (GPS) device 29 that is the on-board device 24 is connected to the information system ECU 22D. The GPS device 29 is a device that measures a current position of the vehicle 12. The GPS device 29 includes an antenna (not shown) that receives signals from GPS satellites. Note that, the GPS device 29 may be directly connected to the on-board unit 20.

Figure 3:
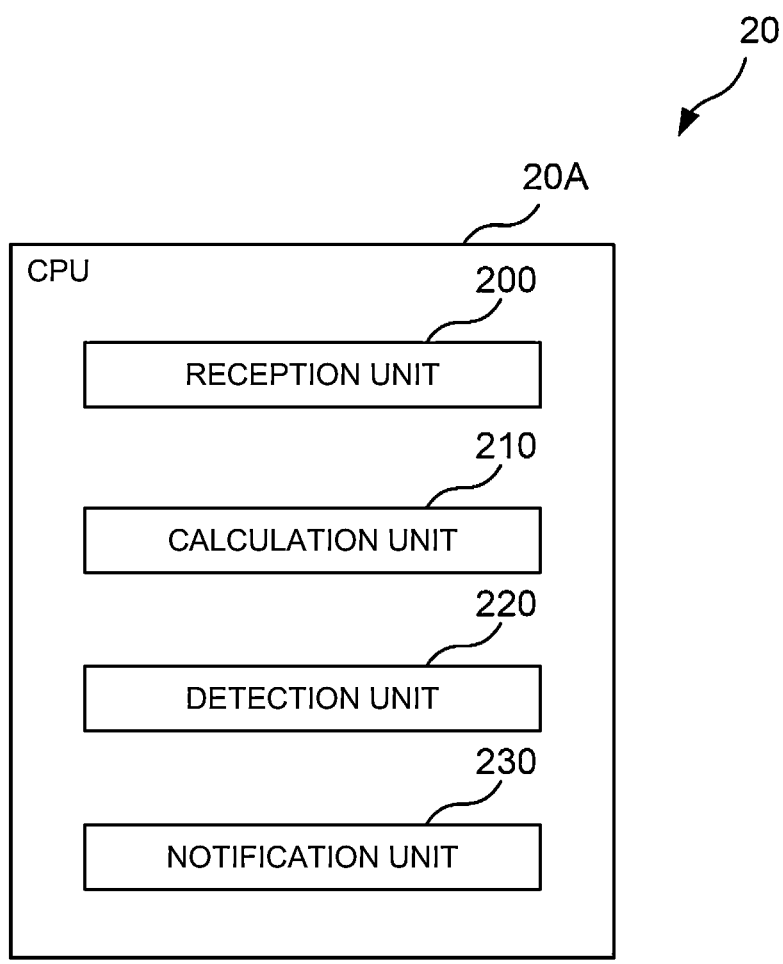
FIG. 3 is a block diagram showing a functional configuration of an on-board unit according to the embodiment.

As shown in FIG. 3, in the on-board unit 20 of the present embodiment, the CPU 20A functions as a reception unit 200, a calculation unit 210, a detection unit 220, and a notification unit 230 by executing the processing program 100.

The reception unit 200 receives information on each of the on-board devices 24 from the corresponding ECU 22. Specifically, the reception unit 200 receives information on the vehicle speed, mileage, and yaw angular velocity of the vehicle 12 via the ADAS-ECU 22A. Further, the reception unit 200 receives information on the steering angle of the steering wheel via the steering ECU 22B. Further, the reception unit 200 receives information on a state of the turn signals via the body ECU 22C. Further, the reception unit 200 receives position information of the vehicle 12 via the information system ECU 22D.

The calculation unit 210 calculates the yaw angle by integrating the yaw angular velocities of the vehicle 12 received by the reception unit 200. Further, the calculation unit 210 calculates a steered angle of a steered vehicle wheel based on the steering angle of the steering wheel received by the reception unit 200. Further, the calculation unit 210 calculates the elapsed time when a right turn event occurs. Here, the right turn event is an event executed to analyze the driving status when the vehicle 12 makes a right turn.

The detection unit 220 has a function of detecting a right turn and a turn of the vehicle 12 by a detection process that will be described later.

When the detection unit 220 detects a right turn, the notification unit 230 notifies the center server 30 of the right turn information. Further, when the detection unit 220 detects a turn, the notification unit 230 notifies the center server 30 of the turn information.

Flow of Control

A flow of the detection process executed by the on-board unit 20 of the present embodiment will be described with reference to the flowchart shown in FIG. 4.

In step S100 shown in FIG. 4, the CPU 20A of the on-board unit 20 executes an acquisition and calculation process. With this step, the CPU 20A acquires the vehicle speed, the turn signal state, the mileage, the steered angle, and the yaw angle of the vehicle 12.

In step S101, the CPU 20A determines whether the vehicle 12 is traveling. Specifically, the CPU 20A determines that the vehicle is traveling when a shift selector is positioned at other than the "P range" and the "R range" and the vehicle speed is higher than 0 kilometer per hour (km/h). When the CPU 20A determines that the vehicle 12 is traveling (YES in step S101), the CPU 20A proceeds to step S102. On the other hand, when the CPU 20A determines that the vehicle 12 is not traveling (NO in step S101), the process returns to step S100.

In step S102, the CPU 20A determines whether the right turn event has occurred. Specifically, the CPU 20A determines that the right turn event has occurred when the steered angle in the right direction is equal to or greater than a predetermined angle and the right turn signal is operating. When the CPU 20A determines that the right turn event has occurred (YES in step S102), the process proceeds to step S103. On the other hand, when the CPU 20A determines that the right turn event has not occurred (NO in step S102), the process returns to step S100.

In step S103, the CPU 20A determines whether a predetermined time or more has elapsed after the right turn event occurs. When the CPU 20A determines that the predetermined time or more has elapsed after the right turn event occurs (YES in step S103), the process proceeds to step S104. On the other hand, when the CPU 20A determines that the predetermined time or more has not elapsed after the right turn event occurs (NO in step S103), the process returns to step S100. Execution of step S103 excludes minor course changes, such as lane changes, from detection conditions of a right turn and a turn.

In step S104, the CPU 20A determines whether the mileage of the vehicle 12 during the right turn event is equal to or greater than a first set value. The first set value is an example of a second threshold value. When the CPU 20A determines that the mileage of the vehicle 12 during the right turn event is equal to or greater than the first set value that is set in advance (YES in step S104), the process proceeds to step S105. On the other hand, when the CPU 20A determines that the mileage of the vehicle 12 during the right turn event is not equal to or greater than the first set value that is set in advance (NO in step S104), the process returns to step S100. Execution of step S104 excludes lane changes and the right turn event on the residential road, etc., from the detection conditions of the right turn and the turn.

In step S105, the CPU 20A determines whether the maximum value of the steered angle is equal to or less than a second set value and the yaw angle is equal to or less than a third set value. The second set value is an example of a first threshold value, and the third set value is an example of a third threshold value. When the CPU 20A determines that the maximum value of the steered angle is equal to or less than the second set value and the yaw angle is equal to or less than the third set value (YES in step S105), the process proceeds to step S106. On the other hand, when the CPU 20A determines that the maximum value of the steered angle is equal to or less than the second set value and the yaw angle is not equal to or less than the third set value (NO in step S105), the process proceeds to step S107.

In step S106, the CPU 20A detects a right turn that is a detection target and notifies the center server 30 of the right turn information. Then, the process returns to step S100.

In step S107, the CPU 20A determines whether the maximum value of the steered angle exceeds the second set value and the yaw angle exceeds the third set value. When the CPU 20A determines that the maximum value of the steered angle exceeds the second set value and the yaw angle exceeds the third set value (YES in step S107), the process proceeds to step S108. On the other hand, when the CPU 20A determines that the maximum value of the steered angle exceeds the second set value and the yaw angle does not exceed the third set value (NO in step S107), the process returns to step S100.

In step S108, the CPU 20A detects a turn that is a detection target and notifies the center server 30 of the turn information. Then, the process returns to step S100.

Summary

The object of the present embodiment is to detect a right turn with a high risk of an accident on a road of the left-hand traffic. The on-board unit 20 of the present embodiment is configured to detect a right turn or a turn when various conditions are satisfied in the case where the right turn event triggered by the start of the right turn of the vehicle 12 occurs.

Here, the on-board unit 20 of the present embodiment does not detect a minute right turn operation due to a lane change as a right turn by excluding the case where the predetermined time has not elapsed after the right turn event occurs from the detection conditions of the right turn or the turn. That is, the lane change can be excluded from a determination of a right turn or a turn.

Further, the on-board unit 20 of the present embodiment does not detect a right turn on the residential road in which the oncoming lane is not present by excluding the case where the mileage of the vehicle 12 after the right turn event occurs is less than the first set value that is set in advance from the detection conditions of the right turn. That is, a right turn on the residential road can be excluded from the determination of the right turn.

The on-board unit 20 of the present embodiment is configured to detect a right turn when the maximum value of the steered angle is equal to or less than the second set value that is set in advance and the yaw angle is equal to or less than the third set value that is set advance. Further, the on-board unit 20 of the present embodiment is configured to detect a turn when the maximum value of the steered angle exceeds the second set value that is set in advance and the yaw angle exceeds the third set value that is set advance.

According to the present embodiment, a turn can be excluded from the determination of the right turn by excluding the case where the maximum value of the steered angle exceeds the second set value from the detection conditions of the right turn. Then, an accuracy of determining that a turn, not a right turn, is made by excluding the case where the yaw angle exceeds the third set value that is set in advance from the detection conditions of the right turn. That is, although it is not essential to use the third set value as the detection condition, the accuracy of the determination of the turn is improved.

Further, as a related art, there is also a method of determining a right turn based on an image of a camera mounted on a vehicle. However, according to the present embodiment, a processing load of the on-board unit 20 can be reduced and a delay in the processing by the on-board unit 20 can be suppressed as compared with a case where a right turn or a turn is detected using an image. Further, according to the present embodiment, in the detection process, the processing load of the on-board unit 20 can further be reduced and the delay in the processing by the on-board unit 20 can further be suppressed by excluding the lane change and the right turn on the residential road from the detection conditions of the right turn and the turn in advance.

Further, according to the on-board unit 20 of the present embodiment, when a right turn is detected, the right turn information is notified to the center server 30, and when a turn is detected, the turn information is notified to the center server 30, whereby the center server 30 can collect information with a high risk of accidents. With this configuration, the center server 30 can provide the manager of the vehicle 12 with the risk of an accident, and the manager can issue warning to a driver of the vehicle 12 who frequently turns right or turns.

Remarks

In the above embodiment, the steered angle of the steered vehicle wheel is used as the condition for detecting a right turn or a turn. However, the present disclosure is not limited to this, and when a steering gear ratio is fixed, the steering angle of the steering wheel may be directly used as the detection condition. Further, in the on-board unit 20 of the above embodiment, the steered angle is calculated based on the steering angle of the steering wheel. However, the present disclosure is not limited to this, and the on-board unit 20 may directly acquire the steered angle by a sensor that detects the steered angle. In this case, the sensor that detects the steered angle corresponds to the first detection unit.

In the above embodiment, the mileage of the vehicle 12 after the right turn event has occurred is acquired based on the vehicle speed sensor 25. However, the present disclosure is not limited to this, and the mileage of the vehicle 12 after the right turn event has occurred may be acquired based on the GPS device 29. In this case, the GPS device 29 corresponds to the second detection unit.

In the above embodiment, the on-board unit 20 is configured to execute the detection process. However, the center server 30 may execute the detection process. In this case, the center server 30 can execute the detection process and detect a right turn or a turn by acquiring the vehicle speed, the turn signal state, the mileage, the steered angle, and the yaw angle of the vehicle 12 from the on-board unit 20.

It should be noted that various processors other than the CPU may execute the display process that is executed when the CPU 20A reads the software (program) in the above embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, the detection process described above may be executed by one of these various processors, or a combination of two or more processors of the same type or different types (for example, a combination of FPGAs, a combination of a CPU and an FPGA, and the like). Further, the hardware structure of each of the various processors is, more specifically, an electric circuit in which circuit elements such as semiconductor elements are combined.

Further, in the above embodiment, a mode in which each program is stored (installed) in a non-transitory computer-readable recording medium in advance. For example, the processing program 100 in the on-board unit 20 is stored in the ROM 20B in advance. However, the present disclosure is not limited to this, and the program may be recorded on a non-transitory recording medium such as a compact disc read-only memory (CD-ROM), a digital versatile disc read-only memory (DVD-ROM), and a universal serial bus (USB) memory to be provided. Further, the program may be downloaded from an external device via a network.

The flow of processing described in the above embodiment is an example, and unnecessary steps may be deleted, new steps may be added, or the process order may be changed within a range that does not deviate from the gist.

What is claimed is:

1. A direction change detection device comprising a processor, wherein the processor is configured to:
   acquire:
      a steered angle toward a specific direction, and
      a mileage of a vehicle in the specific direction at a time point at which an eventrelated to a direction change of the vehicle occurs; and
   determine that the vehicle changed direction to the specific direction in response to:
      a maximum value of the steered angle being equal to or less than a first threshold value, and
      the mileage being equal to or greater than a second threshold value;
   exclude from the determination that the vehicle changed direction a case where the milage is less than the second threshold value;
   acquire a yaw angle of the vehicle from the time point;
   identify a U-turn in response to a determination that the yaw angle exceeds a third threshold value;
   exclude a case of the U-turn from the determination that the vehicle changed direction to the specific direction; and
   control the steering angle of the vehicle toward the specific direction during acquiring of the steered angle.

2. The direction change detection device according to claim 1, wherein the processor is configured to exclude a case where a time of the event is less than a predetermined time from a detection condition of the direction change in the specific direction.

3. The direction change detection device according to claim 1, wherein the processor is configured to provide information related to the direction change to a device outside of the vehicle in response to a determination that the vehicle changed direction to the specific direction.

4. A vehicle comprising:
the direction change detection device according to claim 1;
a first sensor that detects a steering angle of a steering wheel or a steered angle of a steered vehicle wheel of the vehicle; and
a second sensor that detects movement of the vehicle.

5. The direction change detection device according to claim 1, wherein the processor is configured to:
transmit a notification to a server in response to detection of the direction change.

6. The direction change detection device according to claim 5, wherein the processor is configured to:
receive a warning for a driver of the vehicle including the direction change detection device for an increased risk of accident based on the notification to the server.

7. A direction change detection method in which a computer executes processes comprising:
acquiring:
a steered angle toward a specific direction, and
a mileage of a vehicle in the specific direction at a time point at which an eventrelated to a direction change of the vehicle occurs; and
determining that the vehicle changed direction to the specific direction in response to:
a maximum value of the steered angle being equal to or less than a first threshold value, and
the mileage being equal to or greater than a second threshold value; and
excluding from the determination that the vehicle changed direction a case where the milage is less than the second threshold value;
acquiring a yaw angle of the vehicle from the time point;
identifying a U-turn in response to a determination that the yaw angle exceeds a third threshold value;
excluding a case of the U-turn from the determination that the vehicle changed direction to the specific direction; and
controlling the steering angle of the vehicle toward the specific direction during acquiring of the steered angle.

8. A non-transitory storage medium storing a program that causes a computer to execute processes comprising:
acquiring:
a steered angle toward a specific direction, and
a mileage of a vehicle in the specific direction at a time point at which an event related to a direction change of the vehicle occurs; and
determining that the vehicle changed direction to the specific direction in response to:
a maximum value of the steered angle being equal to or less than a first threshold value, and
the mileage being equal to or greater than a second threshold value; and
excluding from the determination that the vehicle changed direction a case where the milage is less than the second threshold value;
acquiring a yaw angle of the vehicle from the time point;
identifying a U-turn in response to a determination that the yaw angle exceeds a third threshold value;
excluding a case of the U-turn from the determination that the vehicle changed direction to the specific direction; and
controlling the steering angle of the vehicle toward the specific direction during acquiring of the steered angle.

* * * * *